(12) United States Patent
Bringhenti

(10) Patent No.: US 8,042,225 B2
(45) Date of Patent: Oct. 25, 2011

(54) GROMMET

(75) Inventor: Gianfranco Bringhenti, Venaria (IT)

(73) Assignee: Delphi Technologies, Inc., Troy, MI (US)

( * ) Notice: Subject to any disclaimer, the term of this patent is extended or adjusted under 35 U.S.C. 154(b) by 27 days.

(21) Appl. No.: 12/371,954

(22) Filed: Feb. 17, 2009

(65) Prior Publication Data

US 2009/0235484 A1    Sep. 24, 2009

(30) Foreign Application Priority Data

Mar. 18, 2008   (EP) .................................. 08005038

(51) Int. Cl.
*F16L 5/02*    (2006.01)
(52) U.S. Cl. .......................................... 16/2.2
(58) Field of Classification Search ............ 16/2.2, 16/2.1, 2.3; 174/650, 153 G
See application file for complete search history.

(56) References Cited

U.S. PATENT DOCUMENTS

| | | | | |
|---|---|---|---|---|
| 4,086,736 A | * | 5/1978 | Landrigan | 52/220.8 |
| 6,557,208 B2 | * | 5/2003 | Huet | 16/2.1 |
| 6,708,366 B2 | * | 3/2004 | Ono et al. | 16/2.5 |
| 6,901,627 B2 | * | 6/2005 | Uchida | 16/2.1 |
| 6,995,317 B1 | * | 2/2006 | Dzurilla | 174/669 |
| 7,723,622 B2 | * | 5/2010 | Dukes et al. | 174/650 |
| 2010/0126768 A1 | * | 5/2010 | Dukes et al. | 174/650 |

FOREIGN PATENT DOCUMENTS

| | | |
|---|---|---|
| DE | 2336280 | 2/1975 |
| DE | 4436778 | 4/1996 |
| EP | 0970853 | 1/2000 |

OTHER PUBLICATIONS

European Search Report dated Jul. 30, 2008.

* cited by examiner

*Primary Examiner* — Victor Batson
*Assistant Examiner* — Matthew Sullivan
(74) *Attorney, Agent, or Firm* — Thomas N. Twomey

(57) ABSTRACT

The present invention relates to a grommet for sealing a conduit to be passed through an opening against said opening. The grommet comprises a sealing body defining an opening therethrough for receiving the conduit as well as at least one sealing collar radially surrounding said sealing body in an unfolded state. The grommet further comprises a retaining means, which is configured for fixing said sealing collar in a folded state.

10 Claims, 2 Drawing Sheets

GROMMET

TECHNICAL FIELD

The present invention relates to a grommet, which is adapted for sealing a conduit as for example a cable or tube to be passed through an opening against said opening, and which comprises a sealing body defining an opening therethrough for receiving the conduit as well as at least one sealing collar or sealing flange radially surrounding said sealing body in an unfolded state.

BACKGROUND OF THE INVENTION

Such a grommet may be used for example for sealing a wire harness leading from the engine compartment of a vehicle into the passenger compartment of the vehicle against a opening in the form of a through hole formed in the body sheet between the engine compartment and the passenger compartment. Hereby, in particular the sealing collar of said grommet serves for the purpose of providing a sound-proof sealing between the two compartments so that the noise emitted by the engine is at least partially screened from the passenger compartment. Hence, said sealing collar represents some kind of a sound-proof flap which rests on a sound-proof matting surrounding the through hole in the body sheet between the two compartments.

When mounting said grommet into said through hole, it may be necessary that the assembler puts his hand into said through hole so as to push or pull the sealing collar through said through hole which is less in diameter than the sealing collar. However, since the edge of said through hole may be relatively sharp, there is a certain risk of injury when the assembler puts his hands into said through hole.

SUMMARY OF THE INVENTION

It is therefore an object of the present invention to improve said grommet to that effect that the risk of injury to the assembler's hands is at least reduced.

The object of the present invention may be met by a grommet that comprises a retaining means, which is configured for fixing said sealing collar in a folded state.

Hence, by means of said retaining means the sealing collar can be fixed in a folded state in which the radial extension of the sealing collar is less than the diameter of the through hole in the body sheet between the two compartments so that the grommet and in particular its sealing collar can be pushed through said through hole without the need for an insertion of the assembler's hands into the through hole. Thus, when mounting the grommet of the present invention into a through hole, the assembler need not insert his hands into said through hole so that the risk of injury to the assembler's hands is significantly reduced.

Advantageous embodiments of the grommet in accordance with the present invention will become apparent from the dependent claims, from the description and from the drawings.

According to a first preferred embodiment, the retaining means may be integrally formed with said sealing collar. In other words, the retaining means may be a part of the sealing collar, which proves to be advantageous to that effect, that the retaining means may not disengage from the sealing collar in the folded state of same, so that the folded state of the sealing collar may be reliably sustained in its folded state. Hence, there is no risk that the sealing collar starting from its folded state converts into its unfolded state due to an unwanted removal of the retaining means from the sealing collar.

According to a specific embodiment, the retaining means may comprise a belt, cord, strap or the like which is adapted for lacing together said sealing collar into its folded state.

Indeed, according to another embodiment, said retaining means could also comprise a button mechanism or the like, for example, which is adapted for fixing the sealing flange in a folded state by engaging one or more buttons with corresponding button holes. However, in contrast to this embodiment, the aforementioned embodiment wherein the retaining means comprises a belt, cord, strap or the like proves to be advantageous to that effect, that by means of a belt, cord or strap the conversion of the sealing collar from its unfolded state into its folded state is relatively simple, since by means of a belt, cord or strap the sealing collar can be drawn together in a very simple way.

In particular, in case that said belt should be flexible in its longitudinal direction as an elastic band or a rubber ring, for example, the folded state of the sealing collar can be achieved by pulling said rubber ring over the at least partially folded sealing collar so that the sealing collar will be completely laced or drawn together when the elastic rubber ring is released due to the elastic characteristics of the band.

According to a still further embodiment of the present invention the belt, cord or strap may comprise a free end, wherein an attachment means as for example a barb means is provided adjacent to the free end for securing said free end to a corresponding attachment means provided at the sealing collar (or at the belt itself). This embodiment may prove to be advantageous, when it is not possible or desired to pull a ring-shaped belt over the (partially) folded sealing collar due to the machinery necessary for folding said sealing collar, for example. In case that the retaining means comprises a belt having a free end, the band may be wrapped around the at least partially folded sealing collar and then fixed with its free end and in particular by means of its attachment means to the sealing collar or to the belt itself, so that the sealing collar may not deploy into its unfolded state.

According to a further specific embodiment the sealing collar may be provided with at least one eyelet which is adapted for securing a position of said retaining means relative to said sealing collar, at least in the folded state of said sealing collar. For example, a plurality of eyelets in the form of loops or lugs may be provided at the circumference of said sealing collar so that when being drawn or laced together by means of a belt extending through said eyelets, the sealing collar may be converted into a folded state in which the sealing collar comprises the shape of a folded walking-stick umbrella. Hence, by the provision of a plurality of equally spaced apart eyelets at the circumference of the sealing collar, the sealing collar may be folded in such a manner that the respective folds are substantially identical with respect to each other.

For the purpose of simplifying the threading of the belt though said eyelets, the free end of said belt may be provided with an elongate and stiff handle by means of which the free end of the belt may be simply inserted into the respective eyelets.

Moreover, both the threading operation and the regularity of the respective folds may be positively affected, when any of said eyelets is formed by a lug or loop extending in a radial direction from the circumference of said sealing collar in the unfolded state of same. This embodiment facilitates easy access to the eyelets for threading the free end of the belt through the openings formed by the eyelet loops.

According to a still further specific embodiment of the invention each member of the group of members consisting of said eyelets and said belt are spaced apart at regular intervals along the circumference of said sealing collar. Hereby, the belt is affixed to a certain extent to the circumference of the sealing collar which again proves to be advantageous with respect to the regularity of the folding pattern.

In another aspect, the present invention relates to a method for compressing a grommet comprising a sealing body, a substantially funnel-shaped sealing collar radially surrounding said sealing collar in an unfolded state and a retaining means, as it is disclosed in any of the preceding passages. The method comprises the steps of everting the funnel-shape of said sealing collar; deforming said everted sealing collar into a folded state; and fixing said sealing collar in said folded state by means of said retaining means.

For the sake of completeness, it should be mentioned that any method-like features disclosed in the preceding paragraphs may be analogously applied to the method of compressing a grommet.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
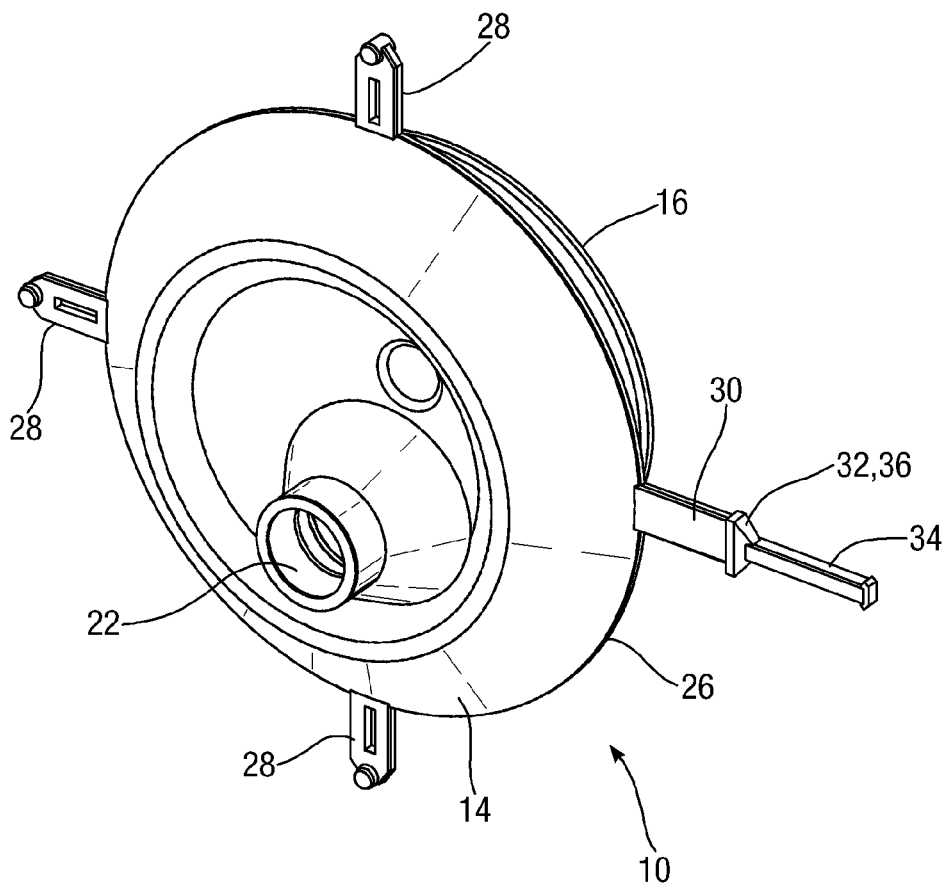
FIG. 1 shows a perspective view of an exemplary grommet in an unfolded state.
Figure 2:
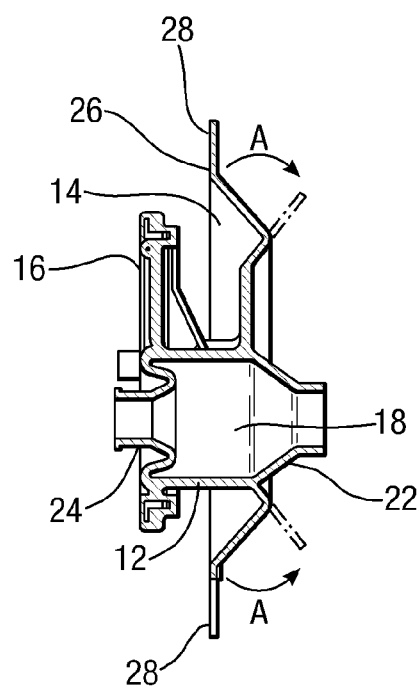
FIG. 2 shows a sectional view of the grommet of FIG. 1.
Figure 3:
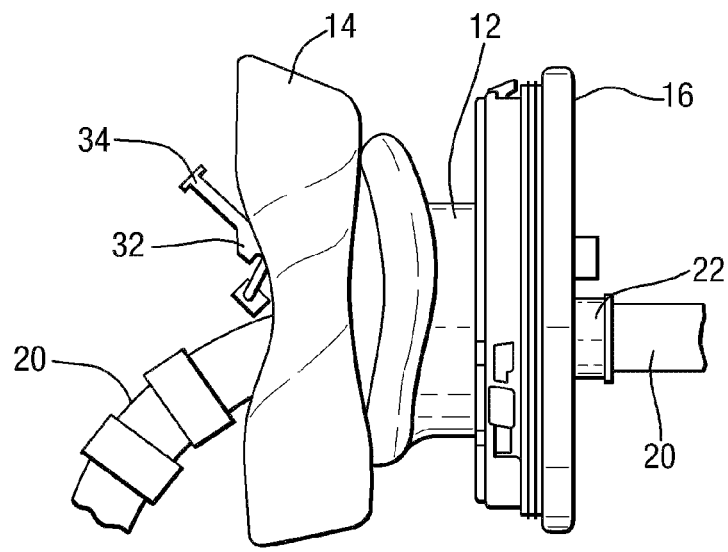
FIG. 3 shows a side-view of the grommet of FIG. 1 folded in accordance with the method of the present invention.
Figure 4:
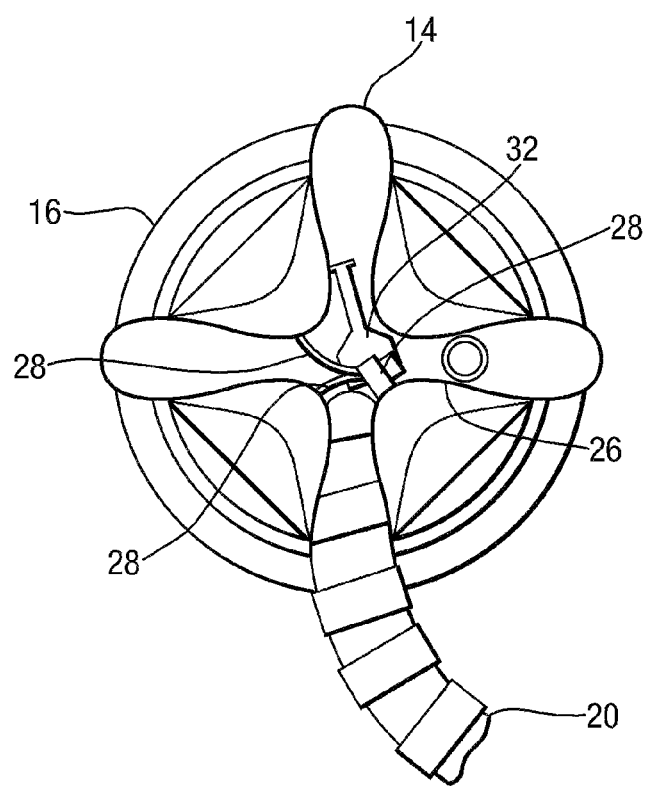
FIG. 4 shows a front view of the grommet depicted in FIG. 3.

The exemplary grommet 10 depicted in FIGS. 1 and 2 comprises a sealing body 12 as well as two sealing flanges 14, 16 being spaced apart with respect to each other in an axial direction of the sealing body 12. The sealing body 12 defines an opening 18 therethrough which is adapted for receiving a conduit as for example a wire harness 20, as depicted in FIGS. 3 and 4. The sealing body 12 is provided with two sealing lips 22, 24 which are spaced apart and extend in a radially inward direction from the sealing body 12. Hence, the sealing lips 22, 24 are adapted for sealing the wire harness 20 against the main body 12.

As will become apparent from FIG. 2, the first flange 14 is substantially funnel-shaped and represents a sealing collar 14 which provides a soundproof flap resting along its outer circumference 26 against a sound proof matting (not shown) secured to a body sheet separating an engine compartment from a passenger compartment of a vehicle. Since said sealing collar 14 rests on the sound matting and therefore exerts a pressure force onto said sound matting, the second flange 16 serves as an abutment member withstanding the pressure forces exerted by the sealing collar 14.

The sealing collar 14 is provided with three integrally formed eyelets 28 in the form of three loops 28, which extend in a radial direction from the circumference 26 of the sealing collar 14 in the unfolded state depicted in FIGS. 1 and 2. Moreover, the circumference 26 of the sealing collar 14 is integrally formed with a retaining means in the form of an elastic belt 30 also extending in a radial direction from the circumference 26 of said sealing collar 14 in its unfolded state. As will become apparent from FIG. 1, the eyelets 28 and the belt 30 are spaced apart at regular intervals along the circumference 26 of the sealing collar 14 which allows a regular umbrella-shaped folding pattern of the sealing collar (cf. FIG. 4).

As shown in FIG. 4, belt 30 at its free end 36 is provided with a barb means 32 in the form of a tap surrounding the belt 30. Moreover, the belt 30 may be extended by an elongate stiff handle 34 having a reduced cross-section compared to the belt 30.

In order to convert the sealing collar 14 starting from its unfolded state depicted in FIGS. 1 and 2 into its folded state having an umbrella-shaped pattern, as it is depicted in FIGS. 3 and 4, the funnel-shaped sealing collar 14 is first everted as shown by arrow A in FIG. 2. Subsequently, the sealing collar 14 everted in this manner is deformed into its folded umbrella-shaped state by threading handle 34 of belt 30 successively through each of the openings formed by the eyelets 28. For example, the belt 30 may be first threaded through the eyelet 28 at the 12 o'clock position (cf. FIG. 1), then through the eyelet 28 at the 9 o'clock position and then through the eyelet 28 in the 6 o'clock position. During this threading process the flexible belt 30 may be expanded in its longitudinal direction, so as to pass through each of the eyelets 28.

When the belt 30 after said threading process is released, the belt 30 will contract in its longitudinal direction so that the positions of the circumference 26 of the sealing collar 14 provided with the eyelets 28 and belt 30, respectively, are pulled in a radially inward direction, so that the sealing collar 14 achieves its specific umbrella-shaped folding pattern, as it is depicted in FIG. 4. Hereby, the barb means 32 provided at the free end 36 of the belt 30 rests against the eyelet 28 at the 6 o'clock position so that the belt 30 may not slide out of any of the eyelets 28.

Hence, the umbrella-shaped folded state of the sealing collar 14 is fixed by means of said belt 30 so that grommet 10 can be pushed through a through hole in a body sheet separating an engine compartment from a passenger compartment, wherein the folded circumference 26 of the sealing collar 14 can be pushed through said through hole without the need of an assembler inserting his hands through the through hole so as to pull the sealing collar 14 through said through hole. Thus, since the assembler need not insert his hands into said through hole during mounting said grommet into said through hole, the risk of injury to the assembler's hands is significantly reduced.

The invention claimed is:

1. A grommet for sealing a conduit to be passed through a through hole in a body sheet and for applying a pressure force against said body sheet, the grommet comprising:
   a sealing body defining an opening therethrough and sized to fit through said body sheet through hole;
   a first sealing flange radially surrounding said sealing body in an unfolded state and having an outer circumference adapted to apply the pressure force to said body sheet surrounding said through hole;
   a second sealing flange surrounding said sealing body serving as an abutment member against said body sheet surrounding said through hole to withstand said first sealing flange's pressure force; and
   a retaining means configured for fixing said first sealing flange in a folded state suitable to pass freely through said body sheet through hole, and
   characterized in that the first sealing flange is circular, and said retaining means and a plurality of attachment means are attached to, and disposed about a circumferential edge of said first sealing flange, and characterized in that said retaining means comprises a belt and the plurality of attachment means comprises a plurality of eyelets, and the eyelets are equally radially spaced about the circumferential edge of the sealing collar, said belt being formed of a flexible material to lace the eyelets together to form the folded state.

2. A grommet for sealing a conduit to be passed through a through hole in a body sheet and for applying a pressure force against said body sheet, the grommet comprising:

a sealing body defining an opening therethrough and sized to fit through said body sheet through hole;

a first sealing flange radially surrounding said sealing body in an unfolded state and having an outer circumference adapted to apply the pressure force to said body sheet surrounding said through hole;

a second sealing flange surrounding said sealing body serving as an abutment member against said body sheet surrounding said through hole to withstand said first sealing flange's pressure force; and a retaining means configured for fixing said first sealing flange in a folded state suitable to pass freely through said body sheet through hole, characterized in that said retaining means comprises a belt that further includes an elongate handle extendable away from a free end of said belt.

3. The grommet as defined by claim 2, characterized in that the first sealing flange is circular, and said retaining means and a plurality of attachment means are attached to, and disposed about a circumferential edge of said first sealing flange.

4. The grommet as defined by claim 2, characterized in that said belt comprises the free end including a tap surrounding the belt and having a larger cross section area the a cross section area of the belt, said tap being disposed adjacent the free end for removeably securing a plurality of attachment means.

5. The grommet as defined by claim 2, characterized in that a cross section area of the handle is less than a cross section area of the belt.

6. The grommet as defined by claim 1, characterized in that the plurality of eyelets comprise three eyelets.

7. The grommet as defined by claim 2, characterized in that the folded state of the first sealing flange allows insertion and fitting of the grommet into the through hole and an unfolded state of the sealing collar retains the grommet in the through hole.

8. The grommet as defined by claim 1, characterized in that at least one of said eyelets is formed by a lug extending in a radial direction away from the circumferential edge.

9. The grommet as defined by claim 2, characterized in that the first sealing flange has a shape in the folded state, said shape having an undeployed umbrella-shaped pattern.

10. The grommet as defined by claim 2, characterized in that said first sealing flange is substantially funnel-shaped where the funnel is enlarged in a direction towards the second sealing flange when the first sealing flange is in the unfolded state, and the sealing body comprises at least one sealing lip that seals the conduit against the sealing body of the grommet.

* * * * *